US005529818A

United States Patent [19]

Tsuda et al.

[11] Patent Number: 5,529,818

[45] Date of Patent: Jun. 25, 1996

[54] LIQUID CRYSTAL DISPLAY DEVICE

[75] Inventors: Kazuhiko Tsuda, Shijonawate; Tokihiko Shinomiya, Nara; Shinji Yamagishi, Osaka; Shuichi Kozaki, Nara, all of Japan

[73] Assignee: Sharp Kabushiki Kaisha, Osaka, Japan

[21] Appl. No.: 291,851

[22] Filed: Aug. 17, 1994

[30] Foreign Application Priority Data

Sep. 1, 1993 [JP] Japan .................................... 5-217232
Sep. 1, 1993 [JP] Japan .................................... 5-217233

[51] Int. Cl.$^6$ .................................................. G02F 1/1337

[52] U.S. Cl. .................................. 428/1; 359/75; 359/76; 359/77; 359/78

[58] Field of Search ............................. 428/1; 359/75–78

[56] References Cited

U.S. PATENT DOCUMENTS 4,367,924 1/1983 Clark et al. ................................ 428/1
5,128,788 7/1992 Takatoh et al. ............................ 428/1

FOREIGN PATENT DOCUMENTS 9111747 8/1991 WIPO .

OTHER PUBLICATIONS

Document: "A surface bistable nematic display (SBIND)"; R. Barberi and G. Durand pp. 142–144; Dec. 1992.
Noel A. Clark, Appl. Phys. Lett. 36(11), 1 Jun. 1980, pp. 899–901.
Riccardo Barberi et al, SID 91 Digest, pp. 606–607. Dec. 1991.
International Publication WO 92/00546 published Jan. 9 1992.
Appl. Phys. Lett. 60(9), 2 Mar. 1992, pp. 1085–1086.

*Primary Examiner*—Alexander S. Thomas

[57] ABSTRACT

A liquid crystal display device includes upper and lower substrates having upper and lower electrodes formed on a surface of respective upper and lower substrates, and upper and lower orientation films formed over the surface of respective upper and lower electrodes. A nematic liquid crystal is sandwiched between the upper and lower substrates. A driver mechanism shifts the longitudinal axes of molecules of the liquid crystal, and is adapted to apply a voltage to the liquid crystal for selectively and bistably executing switching between a first state in which the longitudinal axes of liquid crystal molecules adjacent the upper substrate have a tilt angle with respect to the upper substrate and the longitudinal axes of liquid crystal molecules adjacent the lower substrate are parallel to the lower substrate, while the longitudinal axes of liquid crystal molecules adjacent the upper and lower substrates projected on the planes of the upper and lower substrates are oriented in a generally same direction, and a second state wherein the longitudinal axes of the liquid crystal molecules adjacent the lower substrate have a tilt angle with respect to the cross-sectional direction of the lower substrate and the longitudinal axes of the liquid crystal molecules adjacent the upper substrate are parallel to the cross-sectional direction of the upper substrate, while the longitudinal axes of the liquid crystal molecules adjacent the lower and upper substrates projected on the lower and upper substrates are oriented in a generally same direction.

12 Claims, 7 Drawing Sheets

LIQUID CRYSTAL DISPLAY DEVICE

BACKGROUND OF THE INVENTION

1. Field of the Invention

The present invention relates to liquid crystal display devices and, more particularly, to liquid crystal display devices employing a nematic liquid crystal and a polymer orientation film.

2. Related Art

The conventional display modes of display devices using liquid crystals include dynamic scattering (DS) type, twisted nematic (TN) type, electrically controlled birefringence (ECB) type, phase change (PC) type, memory type, guest-host (GH) type, surface stabilized ferroelectric (SSF) type, Heilmayer type and Whitetyler type. These modes differ depending on the method of converting electric signals applied to the liquid crystal into optical information.

Among these, TN type and its improvement, super twisted nematic (STN) type, both mainly employing a nematic liquid crystal, are currently used for commercial display device articles such as watches, hand-held calculators, word processors, personal computers, television sets and the like. These two types of display devices utilize the optical rotatory power of a liquid crystal.

Another type of known liquid crystal display devices is a dye blend type which utilizes light absorption by a dichroic dye blended in a liquid crystal. Heilmayer-type and Whitetyler-type display devices have been proposed as dye blend type display devices. Heilmayer type utilizes the combination of a liquid crystal blended with a dichroic dye and a single polarizer plate. Whitetyler type utilizes a chiral dopant which allows molecules of a liquid crystal blended with a dichroic dye to be helically oriented between substrates, thereby requiring no polarizer plate.

However, since the operational principle of TN-type, STN-type, Heilmayer-type and Whitetyler-type liquid crystal display devices is based on the field effect which utilizes the dielectric anisotropy of liquid crystal molecules, the response time obtained is on the order of several hundreds to several dozens milliseconds. Accordingly, the conventional combinations of nematic liquid crystals and display mode devices cannot provide a response speed fast enough for applications such as to a CAD terminal which require faster response. In addition, their electro-optical effect is attributed to the switching between two states of liquid crystal molecules, i.e. a state wherein the liquid crystal molecules are in a homogeneously twisted orientation and a state wherein the liquid crystal molecules are upstanding with respect to the plane of the substrate. Hence, the viewing angle dependence on the twist direction of liquid crystal molecules is unavoidable due to the operational principle.

As a liquid crystal display device which provides faster response, N. A. Clark and Lagerwall have proposed a surface stabilized ferroelectric liquid crystal display (SSFLCD) in Appl. Phy. Lett., 36,899 (1980), Japanese Unexamined Patent Application No. 56-107216 (1981), and U.S. Pat. No. 4,367,924. The SSFLCD utilizes electrical interaction between a polarity generated by the spontaneous polarization of a smectic liquid crystal and a polarity generated by an electric field to achieve the switching on cones on which liquid crystal molecules are movable. This allows significantly faster switching than the nematic liquid crystal, and offers an advantage of no viewing angle dependence. However, there still exist some problems. That is, the layer structure of smectic liquid crystal molecules makes the orientation control difficult, the orientation once broken by a shock is hardly recoverable, and a like problem.

Furthermore, two types of bistable liquid crystal display devices using a nematic liquid crystal have been proposed by Georges, Durand.

One of such types of liquid crystal display devices uses chiral ions to generate drive torques, as disclosed in PCT Publication No. WO 91/11747. This display device uses both dextrorotatory and levoratatory chiral ions blended in a liquid crystal to provide ununiform ion distribution for the generation of drive torques by applying voltage. Like SSFLCD, the application of pulsed electric field switches the liquid crystal molecules in parallel relation to the plane of the substrate. However, the use of impurity ions in this device presents critical problems in its reliability.

The other type utilizes flexoelectrical polarization caused by orientation distortion to generate drive torques, as disclosed in PCT Publication No. WO 92/00546. This device is free from any serious problems due to impurities, and is more reliable. Like SSFLCD, the application of pulsed electric field switches the liquid crystal molecules parallel to the plane of the substrate, and the response time of this device is about 100 μsec. There is no viewing angle dependence because liquid crystal molecules are switched parallel to the plane of the substrate. The use of a nematic liquid crystal eliminates such problems as presented by SSFLCD, i.e. difficulty in orientation control and lower shock resistance, and enjoys a wider range of operational temperatures.

In FIG. 10, there is shown the structure of a nematic bistable display device utilizing flexoelectrical polarization which was reported by Georges, Durand in SID Precedings 606–607 (1991) and Appl. Phys. Lett., 1085–1086, Vol. 60 No. 9 (1992). FIG. 10 illustrates the display as including glass plates 7 and 8, liquid crystal layer 9, transparent electrodes 10, SiO orientation films 11 and spacers 12. The SiO orientation film is deposited by evaporation at an angle of 74° with respect to the substrate normal as having a thickness of 30 Å, and the diameter of the spacers is about 1 to about 3 μm. This condition stabilizes the orientation C of a liquid crystal molecule perpendicular to the direction of SiO evaporation and parallel to the plane of the substrate, as shown in FIG. 11. However, when twist power is generated by the addition of a chiral dopant, two orientations A and B appear wherein the liquid crystal molecule is tilted by θ° with respect to the plane of the substrate with its projection onto the plane of the substrate being deviated by α° and —α° from the direction of SiO evaporation. That is because the anchoring energy between the interface and the liquid crystal molecules is low.

FIG. 12 shows a direction of SiO evaporation and directions in which the liquid crystal molecules can be stably oriented. The directions of the orientation treatment (or SiO evaporation) on the upper and lower substrates are twisted by 45° from the anti-parallel relation. The liquid crystal material contains a chiral dopant that allows a single liquid crystal body to be twisted by 22.5° between the upper and lower substrates when a orientation of the single liquid crystal body is not controlled. The twist direction of the liquid crystal orientation is opposite to the twist between the SiO evaporation directions on the upper and lower substrates as shown in FIG. 12. The liquid crystal material injected under this condition have stable molecular orientations restricted under the effect of the chiral dopant, which includes two stable combinations of 1 to 3' orientation and 3 to 2' orientation.

FIGS. 13*a* and 13*b* are cross-sectional views of the liquid crystal display device, which correspond to the 1 to 3' orientation and 3 to 2' orientation, respectively, as shown in FIG. 12. If the molecule of the liquid crystal used in the device is of wedge shape, flexoelectrical polarization is generated by splay-type orientation distortion. The directions of the flexoelectrical polarizations are shown by the arrows in FIGS. **13*a* and 13*b*. The vertical components of the flexoelectrical polarizations shown in FIGS. 13*a* and 13*b* have opposite directions. Therefore, the bistable switching between these two states shown in FIGS. 13*a* and 13*b*** is achieved by reversing the direction of the vertical component of the flexoelectrical polarization by the application of pulsed electric field.

However, the conventional bistable nematic liquid crystal display device employs an SiO oblique evaporation film as an orientation film and it is therefore difficult to form a uniform film over a large area. This will result in a lower productivity.

The above mentioned display device, when employed as a liquid crystal display device of dye blend type which uses a dichroic dye blended in liquid crystal material, has a low optical efficiency because the rotation angle of the longitudinal molecular axis of liquid crystal is about 45°.

SUMMARY OF THE INVENTION

The present invention provides a liquid crystal display device comprising upper and lower substrates disposed in a generally parallel and opposed relation each of the substrates having an electrode formed in a selected pattern on a surface thereof and an orientation film formed over the entire surface thereof, a liquid crystal sandwiched between the substrates, and driver means for shifting the longitudinal axes of molecules of the liquid crystal. The said liquid crystal is a nematic liquid crystal, and the orientation film is formed of a polymer having at least one side-chain six-membered ring group and treated for a uniaxial orientation. The driver means is adapted to apply a voltage to the liquid crystal for selectively and bistably executing switching between a first state wherein the longitudinal axes of liquid crystal molecules adjacent the upper substrate have a tilt angle with respect to the substrate and the longitudinal axes of liquid crystal molecules adjacent the lower substrate are parallel to the lower substrate, while the longitudinal axes of liquid crystal molecules adjacent the upper and lower substrates projected on the planes of the substrates are oriented in a generally same direction, and a second state wherein the longitudinal axes of the liquid crystal molecules adjacent the lower substrate have a tilt angle with respect to the substrate and the longitudinal axes of the liquid crystal molecules adjacent the upper substrate are parallel to the substrate, while the longitudinal axes of the liquid crystal molecules adjacent the lower and upper substrates projected on the substrates are oriented in a generally same direction.

FIG. **13*a*** is a schematic representation illustrating the orientation of liquid crystal molecules and the direction of flexoelectrical polarization appearing under that particular condition in a cross section of a liquid crystal display device.

FIG. **13*b*** is a schematic representation illustrating the orientation of liquid crystal molecules and the direction of flexoelectrical polarization appearing under that particular condition in a cross section of a liquid crystal display device.

DESCRIPTION OF THE PREFERRED EMBODIMENTS

According to the present invention, an orientation film refers to a film made of a polymer having at least one six-membered ring group, has an inplane orientation per se and is treated by a further uniaxial orientation treatment.

To obtain an inplane orientation film, a polymer material is applied, for example, by spin coating which provides the film with an orientation along the centrifugal direction. Alternatively, an orientation-free film is stretched in a particular direction and then stretched in the transverse direction to provide an inplane orientation film. Though the orientation film according to the present invention can be prepared by either of the above methods, the former is mope preferable.

According to the present invention, it is essential to perform a uniaxial orientation treatment on a thus prepared inplane orientation film. A preferable uniaxial orientation treatment includes rubbing.

The degree of orientation of the orientation film can be defined by measuring the molecular orientation of a nematic liquid crystal on the orientation film. The nematic liquid crystal molecules adjacent the orientation film are oriented in two directions: one generally parallel to the direction of the uniaxial orientation treatment; and the other deviated by 10° to 80° from the direction of the uniaxial orientation treatment.

Figure 1:
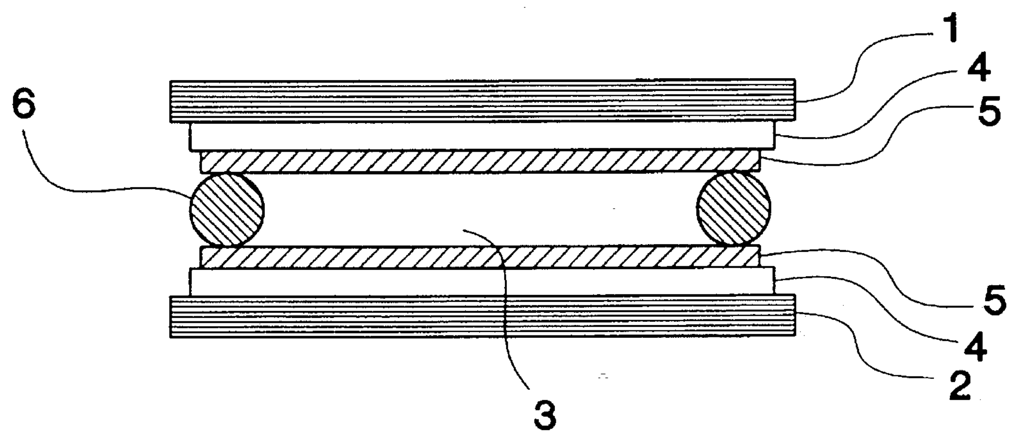
FIG. 1 is a schematic view of a liquid crystal display according to the present invention.

With reference to the attached drawings, the present invention will be hereinafter described in detail. FIG. 1 shows a panel structure of a liquid crystal display device according to the present invention which includes substrates 1 and 2, a liquid crystal layer 3, transparent electrodes 4, orientation films 5, and spacers 6.

The substrates used in the present invention are insulation substrates, typically glass substrates. On the surface of each of the insulation substrates is formed a transparent electrode in a given pattern which comprises a conductive thin film such as made of $InO_3$, $SnO_2$, or ITO (Indium Tin Oxide).

An insulation film is optionally formed on top of the transparent electrode. Examples of the insulation film include inorganic thin films such as $SiO_2$, SiNx and $Al_2O_3$, and organic thin films such as polyimides, photoresist resins and polymer liquid crystals. An inorganic insulation thin film can be formed by evaporation, spattering, chemical vapor deposition (CVD), or application of solution. An organic insulation thin film can be formed by applying a solution in which an inorganic compound is dissolved or a precursor solution by spinner coating, dip coating, screen printing or roll coating and then curing under predetermined curing conditions (heating or irradiation of light). Alternatively, the organic insulation film can be formed by way of evaporation, sputtering or CVD, or directly by Langumuir-Blodgett (LB) method.

The thickness of the insulation film is preferably 0.01 to 1 μm, more preferably 0.02 to 0.5 μm, and most preferably 0.05 to 0.2 μm. A thickness of less than 0.01 μm is not preferable because the film is influenced by the surface of the glass substrate or transparent electrode. Likewise, a thickness of greater than 1 μm is unfavorable because this makes a level difference on the surface of the glass substrate.

On top of the optionally formed insulation film or the transparent electrode is formed a polymer orientation film having a property of orienting liquid crystal molecules.

Preferable as a material of the orientation film are vinyl compounds having a side-chain aryl group or heterocyclic group (including a group condensed with an aryl group) such as phenyl group, pyridyl group, or carbazoyl group. Specific examples of vinyl compounds having aryl group include polystyrene, poly(2-bromostyrene), poly(3-bromostyrene), poly(4-bromostyrene), poly(2-chlorostyrene), poly(3-chlorostyrene), poly(4-chlorostyrene), poly(2-nitrostyrene), poly(2-phenylstyrene), poly(2-methylstyrene), poly(2-methoxystyrene) and poly(2-hydroxystyrene), and specific examples of vinyl compounds having heterocyclic group include poly(2-vinylpyridine), poly(4-vinylpyridine) and polyvinylcarbazole.

To form the orientation film, such a method is applicable that a solution in which the polymer is dissolved is applied on the application surface under centrifugal force and then solvent is removed to orient the polymer along the centrifugal direction.

In this method, the centrifugal force flows the viscous solution in which the polymer is dissolved, and orients the polymer chains along the centrifugal direction. In this case, the larger the centrifugal force and the lower the viscosity of the polymer solution as far as a film is formable, the more easily the orientation can be obtained. Examples of the solvents to be used include aromatic hydrocarbons such as benzene, toluene and xylene, halides such as tetrachlorocarbon, and ketones such as ethylmethylketone. The polymer is dissolved in the solvent in a concentration of 10 to 50% by weight, and the polymer solution is applied under the centrifugal force at a temperature of 10° to 70° for orientation. The revolution speed for the centrifugation is, for example, 100 to 2,000 rpm, though more specific centrifugal condition is determined by the kind and polymerization degree of the polymer.

The thus formed polymer film is stretched 5 to 10 times in one direction, e.g. in a longitudinal direction, and then stretched 1.5 to 10 times in the direction perpendicular to the initial stretching direction, e.g. in a transverse direction. At this time, the ambient temperature is preferably higher than the glass transition point (Tg) to promote the molecular motion, and the stretching speed is preferably lower than a speed that could generate necking, to ensure a uniform film thickness.

A further orientation treatment, for example, rubbing treatment is performed on the polymer orientation film for orienting liquid crystal molecules. The conditions of rubbing treatment are controlled by changing the kinds of cloths, the contact length of raised fibers, and the revolution speed of roller. In the rubbed polymer orientation film for orienting liquid crystal molecules, the polymer molecules are oriented so that their major chains are oriented along the rubbing direction and their side chains are oriented in a direction perpendicular to the rubbing direction. When the rubbing operation is strong enough, the liquid crystal molecules on the orientation film are uniformly oriented along the major chain direction of the polymer molecules or generally parallel to the plane of a substrate. When the rubbing operation is weak, the liquid crystal molecules are uniformly oriented parallel to the side chain direction of the polymer molecules or at a certain tilt angle with respect to the substrate. Therefore, the liquid crystal molecules can be uniformly oriented in an intermediate direction between the above two states by selecting an appropriate rubbing strength.

The polymer orientation film for orienting the liquid crystal allows the liquid crystal molecules to be oriented in two directions, i.e. parallel to the direction of the orientation treatment and at an angle of 10° to 80° with respect to the direction of the orientation treatment, by selecting an appropriate rubbing strength as mentioned above. Polymer orientation films offering various tilt angles can be also obtained. Accordingly, uniform and large area polymer orientation films having the same property as SiO oblique evaporation film can be easily prepared.

According to the present invention, the orientations of the orientation films on the substrates are arranged to be deviated from each other, preferably by 0° to 90°, more preferably by 45°.

Figure 2:
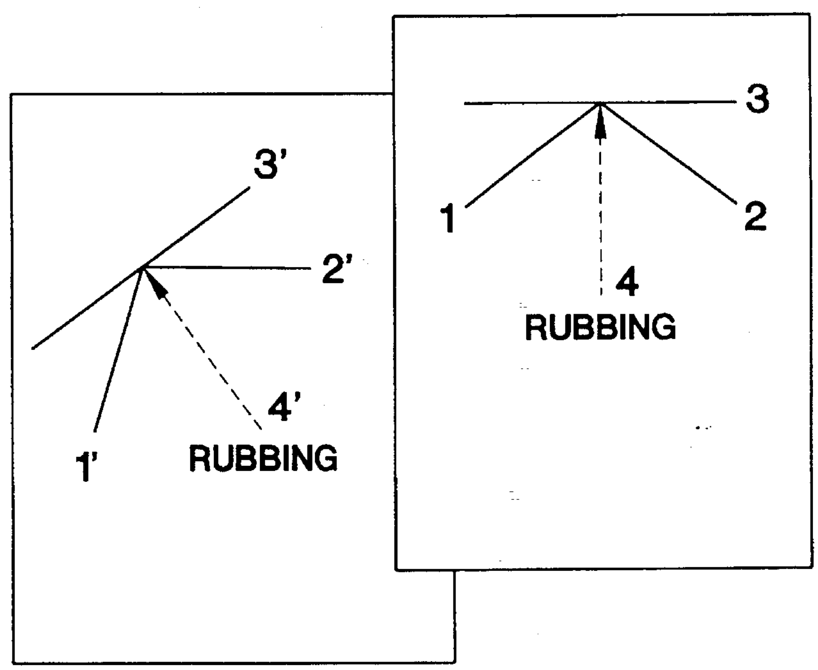
FIG. 2 is a schematic representation illustrating a relation between the rubbing direction and the orientation of liquid crystal molecules.

FIG. 2 shows the rubbing direction and the stable orientations of liquid crystal molecules. A chiral dopant is added to the liquid crystal material and the twist direction of the liquid crystal molecules is made opposite to the twist direction defined between the rubbing directions on the upper and lower substrates. Though the amount of the chiral dopant depends on the kinds of above-mentioned liquid crystal and chiral dopant, it is preferably such an amount that satisfies the following inequality:

$$0.05<d/p<0.1$$

wherein d is the thickness of a liquid crystal display device and p is a chiral pitch. More preferably, d/p is about 0.0625.

Under this condition, there appears only two completely stable orientation combinations, namely, 1 to 3' and 3 to 2' orientations.

This provides an ideal and uniform orientation over a large area to realize an excellent bistable switching.

In a liquid crystal display device of dye blend type, the orientations of the orientation films on the substrates are arranged to be deviated from each other preferably by 90°.

Figure 6:
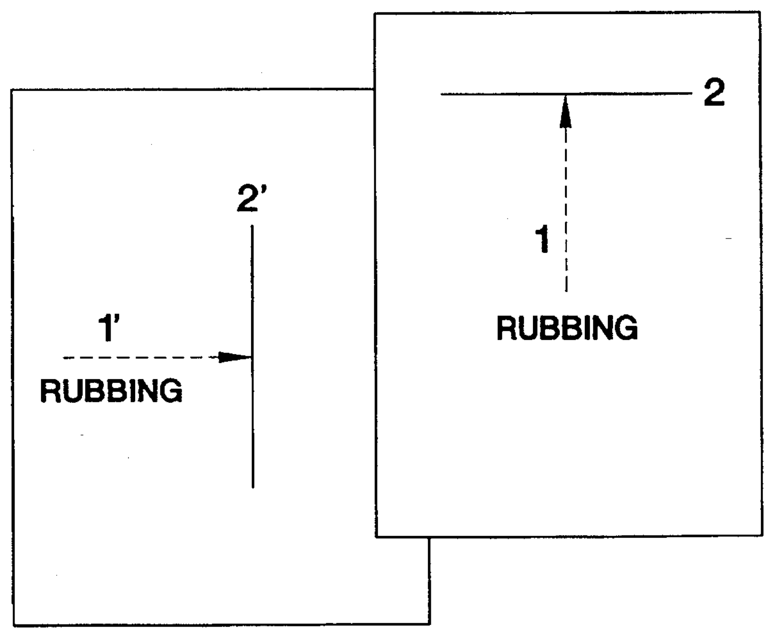
FIG. 6 is a schematic representation illustrating a relation between the rubbing direction and the orientation of liquid crystal molecules.

FIG. 6 shows the rubbing directions and the corresponding stable orientations of liquid crystal molecules in the dye blend type device. Though the amount of the chiral dopant to be added depends on the kinds of aforesaid liquid crystal and chiral dopant, it is preferably such an amount that satisfies the following inequality:

$$0.05<d/p<0.15$$

wherein d is the thickness of a liquid crystal display device and p is a chiral pitch. More preferably, d/p is about 0.125.

Under this condition, there appears only two completely stable orientation combinations, namely, 1 to 2' and 2 to 1' orientations.

In the 1 to 2' orientation state, the orientation of the liquid crystal molecules is obliquely downwardly splayed. In the 2–1' orientation state, on the other hand, the orientation of the liquid crystal molecules is obliquely upwardly splayed. Accordingly, the flexoelectrical polarizations appearing in these two orientation states have opposite direction components along the cross section of the substrates. Therefore, the bistable switching between these two states can be accomplished by reversing the vertical component of flexoelectric polarization by application of a pulsed electric field.

This provides an ideal and uniform orientation over a large area to realize an excellent bistable switching in the liquid crystal display device of dye blend type.

Nematic liquid crystals used in the present invention include Schiff base type, azo type, azoxy type, benzoic ester type, biphenyl type, terphenyl type, cyclohexyl type, carboxylate type, phenylcyclohexane type, pyrimidine type and dioxane type liquid crystals, and multicomponent liquid crystals which are mixtures of the foregoing liquid crystals. Specific examples of commercially available liquid crystal mixtures include Merck's Z-series (Z-1625, Z-1565, Z-1780, Z-1800, Z-1840 and Z-1825), BDH's E-series (E-7, E-37, E-31LV, E-80 and E-44), Roesch's R-series (R-200, R-623, R-701, R-619 and R-627C), Chisso's L-series (L-GR46, L-9106, L-EN24 and L-P23NN23), and Dainippon Ink & Chemicals's D-series (D-801T, D-X01A and D-800). The proper blends of these liquid crystals can be also used.

A chiral dopant (optically active compound) is added to the above liquid crystals to adjust the helical pitch of the liquid crystalline phase. Specific examples of chiral dopants include cholesteryl bromide, cholesteryl-n-hexylether, cholesteryl benzoate, cholesteryl-n-hexylheptanate, cholesteryl nonanate, 4-[4-(2-methylbutyl)phenyl]benzoic acid-4'-cyanophenylester, t-4-(2-methylbutyl)cyclohexylcarboxyl acid cyanobiphenylester, 4-n-hexyloxybenzoic acid-4'-(2-butoxycarboxyl) phenylester, 4-(4'-methylbutyl)-4"-cyano-p-terphenyl, N-(4-ethoxybenzal)-4-(2-methylbutyl) aniline, 4-(2-methylbutyl)benzoic acid-4'-n- hexyloxyphenylester, 4-n-heptoxy-4'-(2-methylbutyloxycarbonyl)biphenyl, 4-(2-methylbutyl)-4'-carbonylphenyl, 4-[4-(2-methylbutyl)phenyl] benzoic acid-4' -butylphenylester.

Further, a dichroic dye of guest-host type is added to above-mentioned liquid crystal material. Examples of dichroic dyes include G214 and G241 for magenta, blend of G282 and G232 for green, G282 and G279 for cyan, G205 and G156 for red, G232 and G143 for yellow, G274 and G277 for blue, all of which are available from Nippon Kankoh-Shikiso Kenkyusho Co., Ltd.

Compounds other than the above mentioned nematic liquid crystal compounds may be added to the liquid crystal material. These compounds are not necessarily required to present a liquid crystalline phase, but include the following compounds:

(a) A compound for adjusting the temperature range of the liquid crystalline phase of the composition to be prepared; and (b) An optically active compound which presents or induces a strong spontaneous polarization in a ferroelectric liquid crystalline phase.

After the injection of the liquid crystal, the injection hole is sealed by a UV-curable resin such as epoxy resin or acrylic resin to complete the liquid crystal display device.

Furthermore, the liquid crystal display device can include polarizer plates disposed on the upper and lower faces thereof with their polarization axes being generally orthogonal to each other, wherein either of the polarization axes of the polarizer plates aligns with either of the optical axes of the liquid crystal.

EXAMPLES

The following examples illustrate the present invention in further detail.

EXAMPLE 1

A liquid crystal display device, as shown in FIG. 1, for bistably switching the state of nematic liquid crystal was fabricated in accordance with the following process:

1. A plurality of transparent electrodes 4 were formed into a striped pattern on glass substrates 1 and 2. Though the thickness of the transparent electrodes was 1000 Å in this example, the thickness could be 300 to 5000 Å, preferably 1000 to 3000 Å.

2. To form orientation films 5 on the substrates 1 and 2, a solution in which poly(2-nitrostyrene) was dissolved in a concentration of about 10% by weight was applied on the substrates 1 and 2 at a solution temperature of about 25° C. by spin coating. The revolution speed was 1000 rpm. Though the thickness of the film was 500 Å in this example, the thickness could be 400 to 600 Å.

3. Rubbing treatment was made over the orientation films on the substrates. The indentation of rubbing cloth roller was 0.4 mm. The revolution speed of rubbing cloth roller was 150 rpm. The traveling speed of substrate was 6000 mm/min.

4. The rubbing directions of the upper and lower orientation films were specified so that their projections on the substrate were deviated by 45° from each other.

5. Silica bead spacers 6 having a diameter of 1.5 μm were dispersed between the upper and lower substrates as processed in the steps 1 through 4, and the substrates were bonded together with an epoxy resin sealant. The diameter of the silica beads could be 1 to 3 μm, preferably 1.2 to 1.8 μm.

6. Nematic liquid crystal 3 (containing 0.36 Wt. % of chiral dopant S-811 blended in a host liquid crystal 5CB) was injected into the panel fabricated in the steps 1 through 5 by vacuum injection. After the injection, the injection hole was sealed with a UV-curable acrylic resin.

Figure 3:
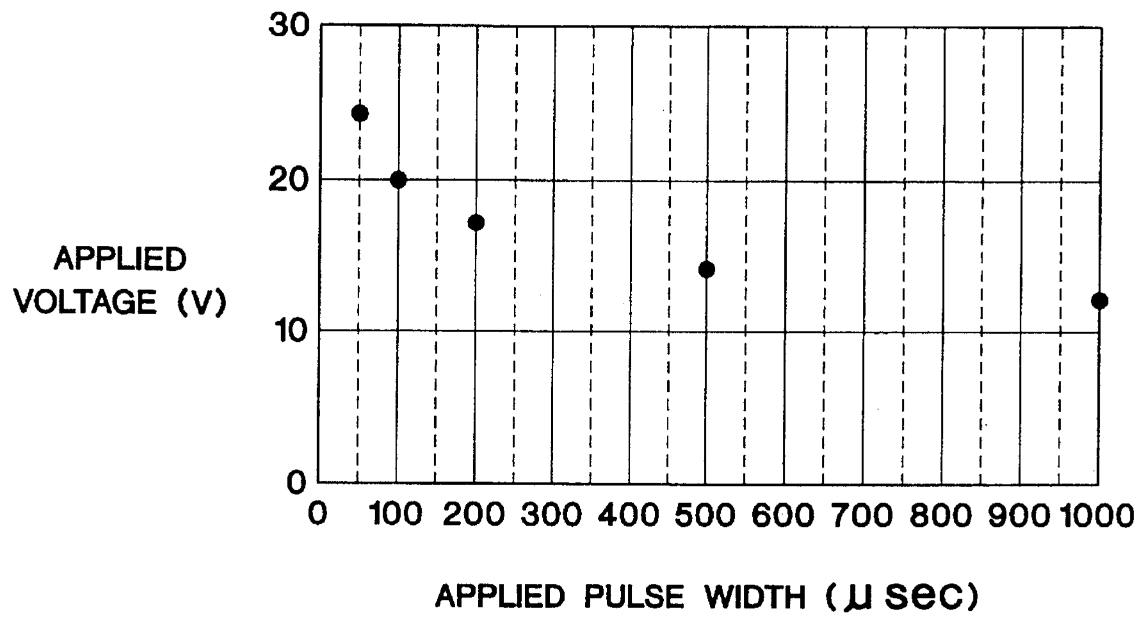
FIG. 3 is a graphic representation showing a relation between the applied pulse width and the applied voltage at the time of switching in a liquid crystal display device of Example 1.

7. When a pulsed electric field was applied to the panel fabricated in accordance with the above mentioned process, the panel stably presented bistablity over an area of 1 $cm^2$. The response characteristic is shown in FIG. 3, wherein it is apparent that response was obtained with a pulse width of 100 μsec and a voltage of ± 12 V.

EXAMPLE 2

1. To form orientation films on the substrates processed in accordance with the step 1 of Example 1, a solution in which poly(2-chlorostyrene) was dissolved in a concentration of about 15% by weight was applied on the substrates at a solution temperature of about 25° C. by spin coating. The revolution speed was 800 rpm. Though the thickness of the film was 500 Å in this example, the thickness could be 400 to 600 Å.

2. Substrates were subjected to rubbing treatment. The indentation of rubbing cloth roller was 0.2 mm. The revolution speed of rubbing cloth roller was 100 rpm. The traveling speed of substrate was 6000 mm/min.

3. According to the steps 5 and 6 of Example 1, a liquid crystal display panel was fabricated.

Figure 4:
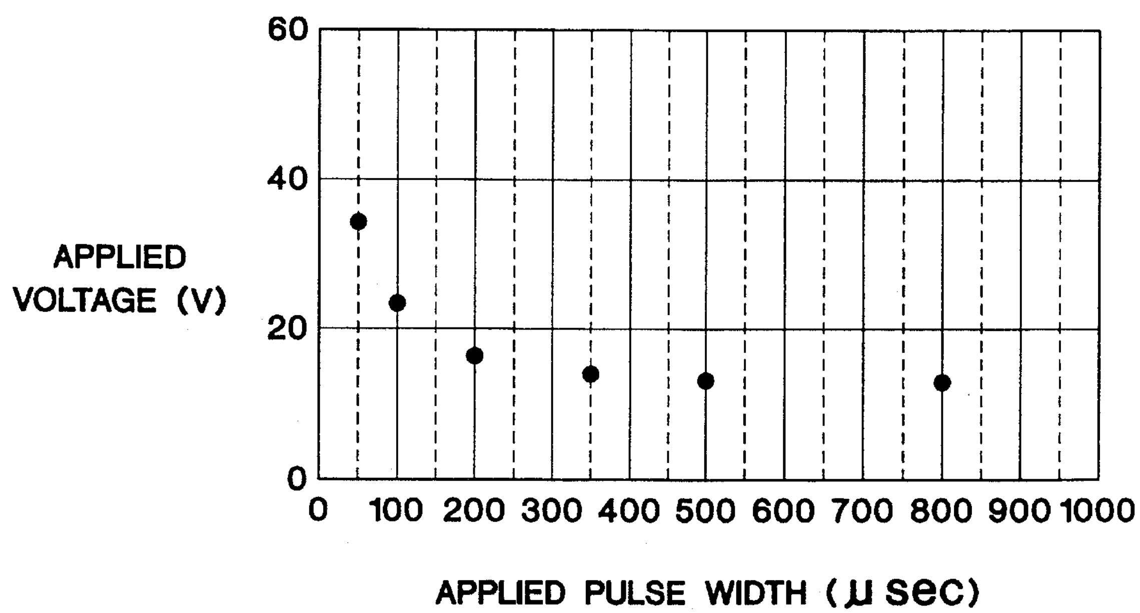
FIG. 4 is a graphic representation showing a relation between the applied pulse width and the applied voltage at the time of switching in a liquid crystal display device of Example 2.

4. When a pulsed electric field was applied to the panel fabricated in accordance with the above mentioned process, the panel stably presented bistablity over an area of 1 $cm^2$. The response characteristic is shown in FIG. 4, wherein it is apparent that response was obtained with a pulse width of 100 μsec and a voltage of ± 15 V.

Reference Example 1

1. The substrates processed in accordance with the step 1 of the above Example 1 were subjected to an SiO oblique evaporation. The evaporation angle was 74° with respect to the substrate normal, and the thickness was 70 Å.

2. The directions of the SiO oblique evaporation on the upper and lower substrates were specified so that their projections on the substrate were deviated by 45° from each other.

3. According to the steps 5 and 6 of the above Example 1, a liquid crystal display panel was fabricated.

Figure 5:
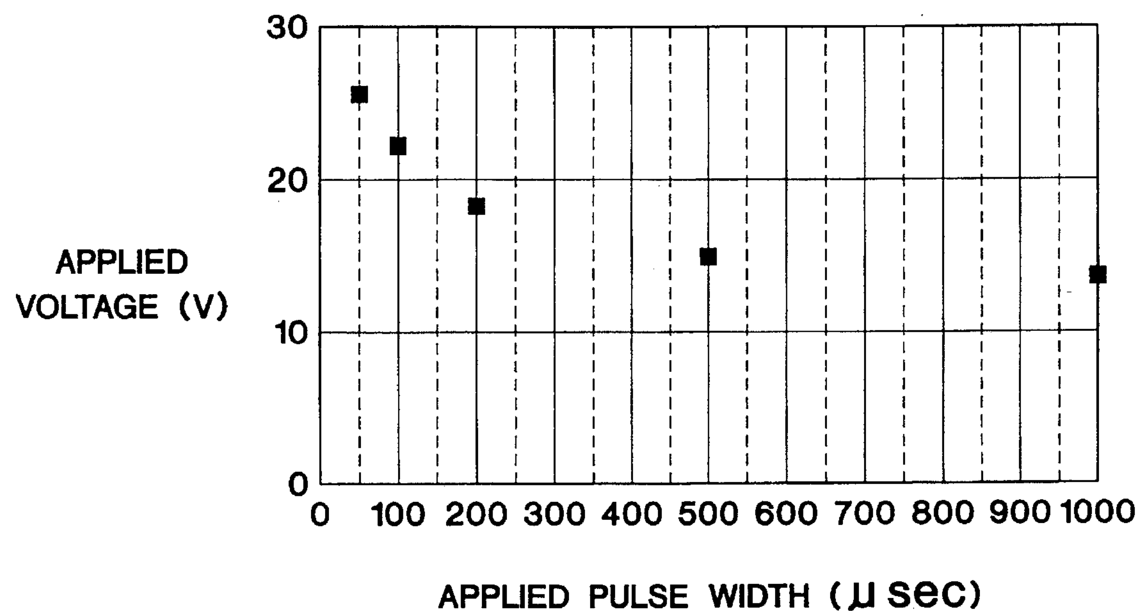
FIG. 5 is a graphic representation showing a relation between the applied pulse width and the applied voltage at the time of switching in a liquid crystal display device of Reference Example 1.

4. When a pulsed electric field was applied to the panel fabricated in accordance with the above mentioned process, the panel stably presented bistablity over an area of 1 $cm^2$. The response characteristic is shown in FIG. 5, wherein it is apparent that response was obtained with a pulse width of 100 μsec and a voltage of ± 22 V.

The foregoing Examples 1 and 2 and Reference Example 1 demonstrated that the present invention provided a fast-response and large-area liquid crystal display device. It has been also proved that the liquid crystal display device of the present invention presented a uniform orientation of liquid crystal and bistable switching over a larger display area than a conventional display device.

EXAMPLE 3

Figure 7:
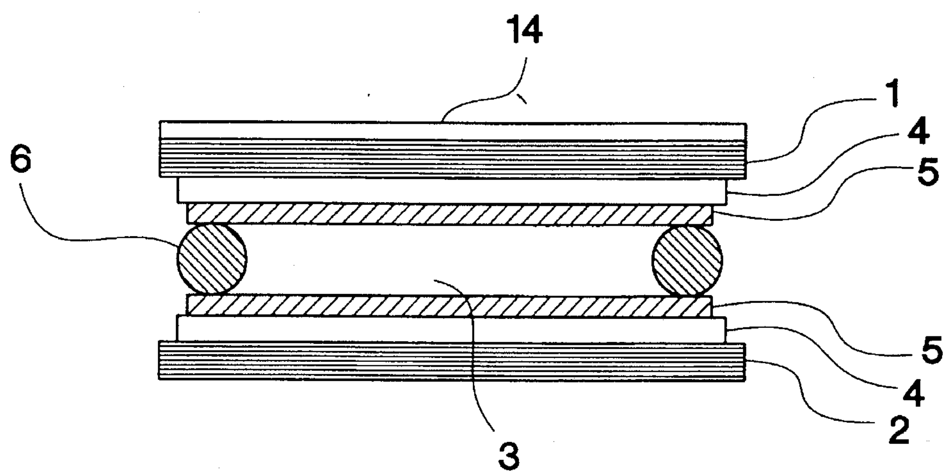
FIG. 7 is a schematic view of a liquid crystal display device according to the present invention.

A liquid crystal display device, as shown in FIG. 7, for bistably switching the state of nematic liquid crystal was fabricated in accordance with the following process:

1. Transparent electrodes 4 with a thickness of 1000 Å were formed on glass substrates 1 and 2. The thickness of the transparent electrodes could be 300 to 5000 Å, preferably 1000 to 3000 Å. In this example, the thickness was 1000 Å.

2. To form an orientation film 5 on the substrates 1 and 2, a solution in which polystyrene was dissolved in a concentration of about 10% by weight was applied on the substrates 1 and 2 at a solution temperature of about 25° C. by way of spin coating. The revolution speed was 1000 rpm. Though the thickness of the film was 500 Å in this example, the thickness could be 400 to 600 Å.

3. Orientation films on substrates were subjected to rubbing treatment. The indentation of rubbing cloth roller was 0.2 mm. The revolution speed of rubbing cloth roller was 100 rpm. The traveling speed of substrate was 6000 mm/min.

4. The rubbing directions of the upper and lower orientation films were specified so that their projections on the substrate were deviated by 90° from each other.

5. Silica bead spacers 6 having a diameter of 1.5 μm are dispersed between the upper and lower substrates as processed in the steps 1 through 4, and the substrates were bonded together with an epoxy resin sealant. The diameter of the silica beads could be 1 to 3 micrometers, preferably 1.2 to 1.8 micrometers.

6. Nematic liquid crystal 3 (containing 0.72 Wt. % of chiral dopant S-811 and 20 Wt. % of black dye LMA-056 blended in a host liquid crystal 5CB) was injected into the panel fabricated according to the steps 1 through 5 by way of vacuum injection. After the injection, the injection hole was sealed with a UV-curable acrylic resin.

7. A polarizer plate 14 was attached onto one face of the display panel fabricated in accordance with the steps 1 through 6. The polarization direction of the polarizer plate was arranged so as to align with the rubbing direction of the orientation film on the side where the polarizer plate was attached.

Figure 8:
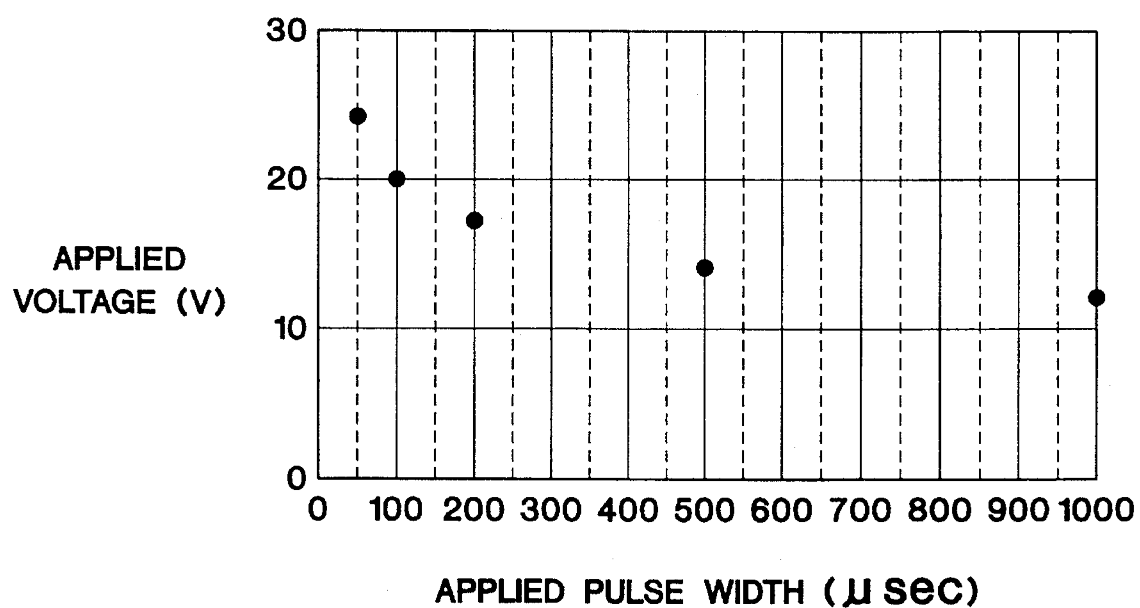
FIG. 8 is a graphic representation showing a relation between the applied pulse width and the applied voltage at the time of switching in a liquid crystal display device of Example 3.

8. FIG. 8 shows a relationship between the strength of electric field and the pulse width observed at the switching when a pulsed electric field was applied to the panel fabricated in accordance with the above mentioned process. (The response characteristic is shown in FIG. 8). It is apparent that response was obtained with a pulse width of 100 μsec and a voltage of ± 12 V.

EXAMPLE 4

Figure 9:
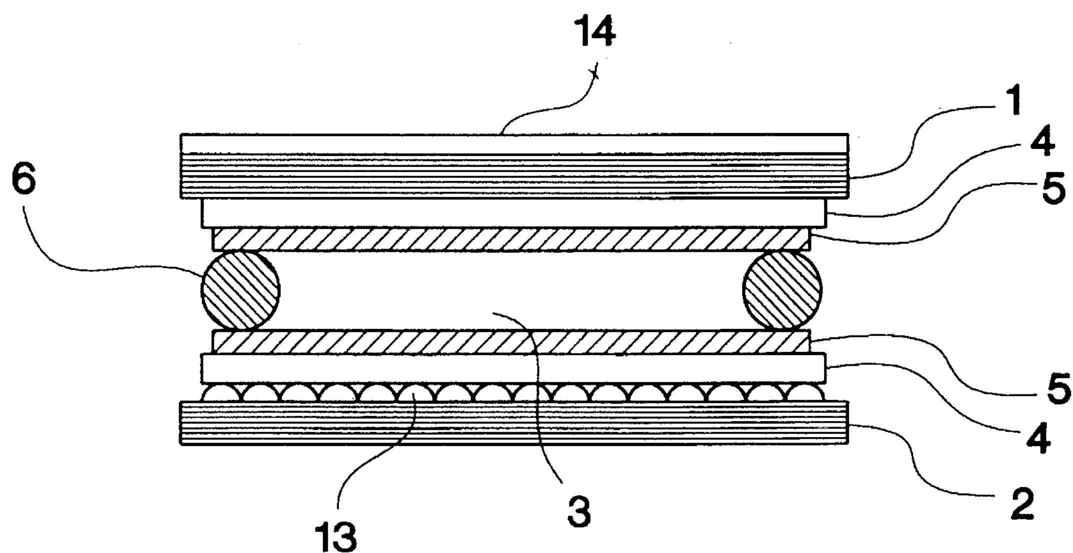
FIG. 9 is a schematic view of a liquid crystal display device according to the present invention.
Figure 10:
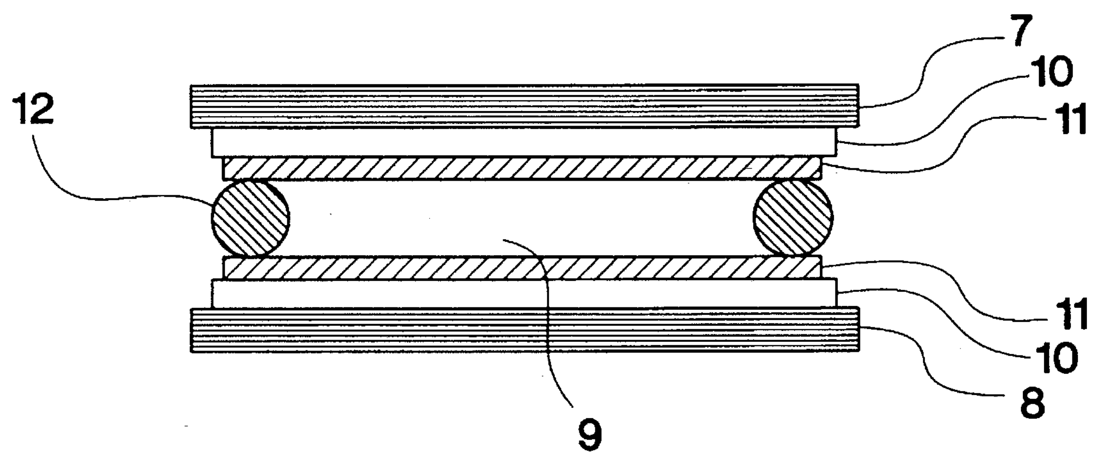
FIG. 10 is a schematic view of a conventional liquid crystal display device.
Figure 11:
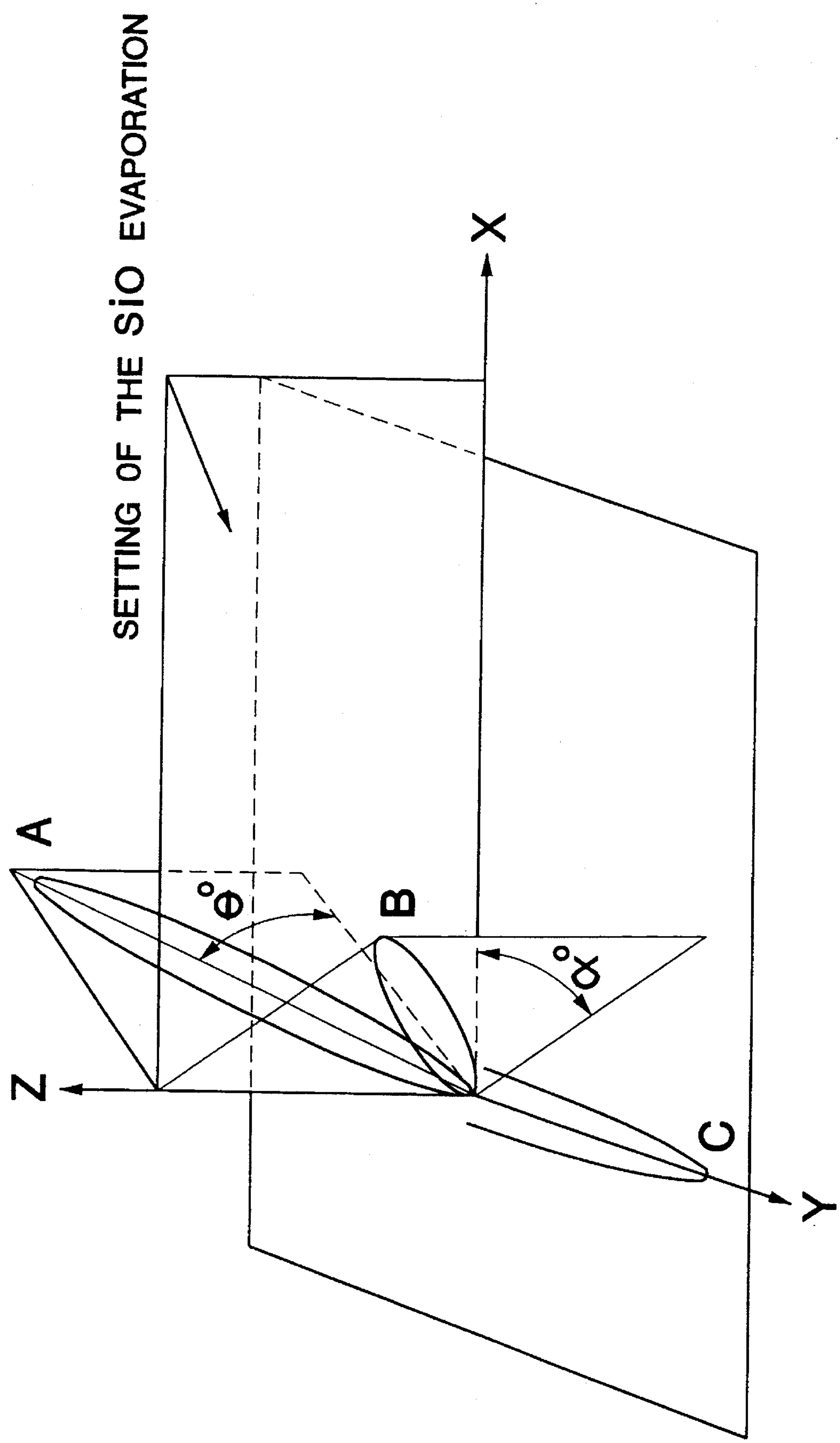
FIG. 11 is a schematic representation illustrating the stable orientation of liquid crystal molecule on SiO orientation film.
Figure 12:
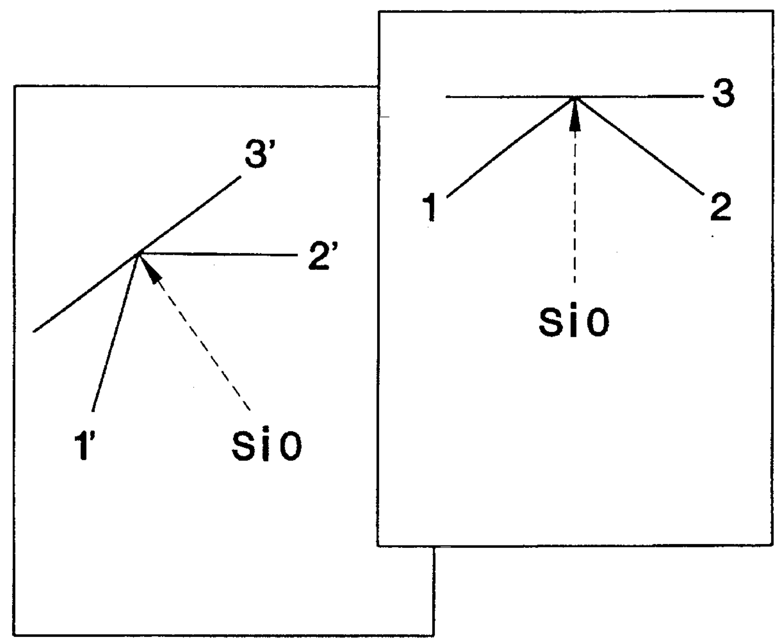
FIG. 12 is a schematic representation illustrating a relation between the direction of conventional SiO evaporation and the orientation of liquid crystal molecules.
Figure 13A:
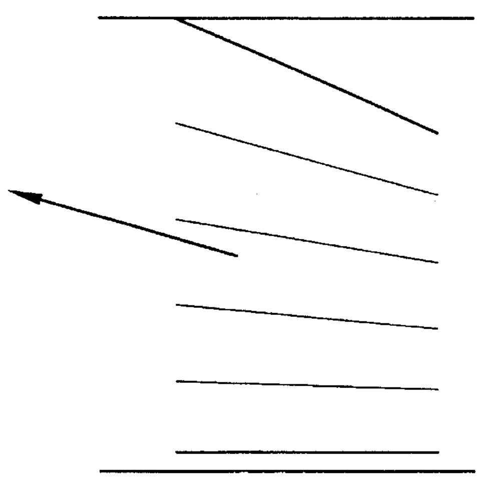
Figure 13B:
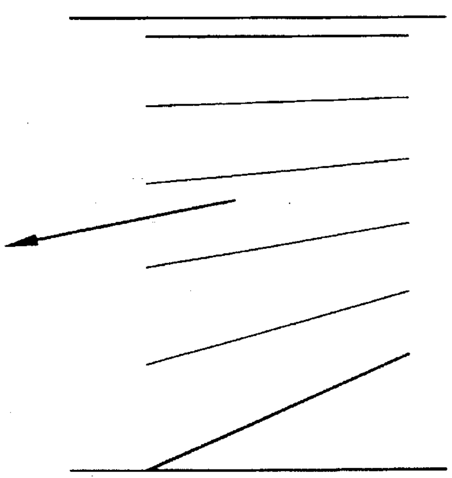

As shown in FIG. 9, a reflection type liquid crystal display device was fabricated in the same manner as in Example 1, except that a reflector plate 13 was inserted between the substrate 2 and the transparent electrode 4. At this time, the contrast ratio of reflected light was 5.

The above Examples 3 and 4 demonstrated that the present invention could provide a nematic liquid crystal display device of dye blend type which has high optical efficiency, high contrast and wide viewing angle.

What is claimed is:

1. A liquid crystal display device comprising:

upper and lower substrates disposed in a generally parallel and opposed relation, each of the substrates having an electrode formed in a selected pattern on a surface of the substrate and an orientation film formed over the surface of the electrode;

a liquid crystal sandwiched between said upper and lower substrates; and driver means for shifting the longitudinal axes of molecules of said liquid crystal, said liquid crystal being a nematic liquid crystal, said orientation film being formed of a polymer having at least one side-chain six-membered ring group, said orientation film having been subjected to a rubbing treatment such that major chains of said polymer are oriented along a rubbing direction and side chains of said polymer are orientated perpendicular to said rubbing direction.

2. The liquid crystal display device of claim 1, wherein said driver means applies a voltage to said liquid crystal for selectively and bistably executing switching between a first state wherein the longitudinal axes of liquid crystal molecules adjacent said upper substrate have a tilt angle with respect to said upper substrate and the longitudinal axes of liquid crystal molecules adjacent said lower substrate are parallel to said lower substrate, while the longitudinal axes of liquid crystal molecules adjacent said upper and lower substrates projected on the planes of said upper and lower substrates are oriented in a generally same direction, and a second state wherein the longitudinal axes of the liquid crystal molecules adjacent said lower substrate have a tilt angle with respect to the cross-sectional direction of said lower substrate and the longitudinal axes of the liquid crystal molecules adjacent said upper substrate are parallel to the cross-sectional direction of said upper substrate, while the longitudinal axes of the liquid crystal molecules adjacent said lower and upper substrates projected on said lower and upper substrates are oriented in a generally same direction.

3. The liquid crystal display device of claim 1, wherein liquid crystal molecules on said orientation film assume a first orientation which is parallel to the direction of the orientation treatment of said orientation film or a second orientation which is deviated by 10° to 80° from the direction of the orientation treatment of said orientation film, the first and second orientations being different in pre tilt angle.

4. The liquid crystal display device of claim 1, wherein said polymer is selected from the group consisting of polystyrene, poly(2-bromostyrene), poly(3-bromostyrene), poly(4-bromostyrene), poly(2-chlorostyrene), poly(3-chlorostyrene), poly(4-chlorostyrene), poly(2-nitrostyrene), poly(2-phenylstyrene), poly(2-methylstyrene), poly(2-methoxystyrene) and poly(2-hydroxystyrene), poly(2-vinylpyridine), poly(4-vinylpyridine) and polyvinylcarbazole.

5. The liquid crystal display device of claim 1, wherein said upper and lower substrates are disposed in an opposed relation such that the orientation of the orientation film on the upper substrate and that of the orientation film on the lower substrate are twisted by 0° to 90° with respect to each other.

6. The liquid crystal display device of claim 5, wherein the orientation of the orientation film on the upper substrate and that of the orientation film on the lower substrate are twisted by about 45° with respect to each other.

7. The liquid crystal display device of claim 1, wherein said liquid crystal contains a chiral dopant.

8. The liquid crystal display device of claim 7, wherein the amount of said chiral dopant is such an amount that satisfies the following inequality:

$$0.05<d/p<0.1$$

wherein d represents the thickness of the liquid crystal display device and p represents the chiral pitch of the liquid crystal.

9. The liquid crystal display device of claim 1, wherein said liquid crystal is blended with a dye.

10. The liquid crystal display device of claim 9, wherein said substrates are disposed in an opposed relation such that the orientation of the orientation film on the upper substrate and that of the orientation film on the lower substrate are twisted by about 90° with respect to each other.

11. The liquid crystal display device of claim 9, wherein said liquid crystal contains a chiral dopant in an amount that satisfies the following inequality:

$$0.05<d/p<0.15$$

wherein d represents the thickness of the liquid crystal display device and p represents the chiral pitch of the liquid crystal.

12. The liquid crystal display device of claim 1, wherein said orientation film is an inplane orientation film which has been further subjected to a uniaxial orientation treatment.

* * * * *